(12) United States Patent
Chengson et al.

(10) Patent No.: US 9,237,003 B1
(45) Date of Patent: Jan. 12, 2016

(54) DIGITAL BIT INSERTION FOR CLOCK RECOVERY

(75) Inventors: David P. Chengson, Aptos, CA (US);
Chang-Hong Wu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1077 days.

(21) Appl. No.: 13/204,391

(22) Filed: Aug. 5, 2011

(51) Int. Cl.
*H04L 7/033* (2006.01)

(52) U.S. Cl.
CPC ..................... *H04L 7/033* (2013.01)

(58) Field of Classification Search
CPC ... H04L 7/033; H04L 25/0262; H04L 7/0334; H04L 2025/03617; H04L 2025/03656; H04L 2025/037; H04L 25/03019; H04L 1/0061
USPC ............. 370/505, 395.62; 375/327, 348, 355, 375/371, 375, 359
See application file for complete search history.

(56) References Cited

U.S. PATENT DOCUMENTS

| | | | |
|---|---|---|---|
| 5,606,317 A * | 2/1997 | Cloonan et al. | 341/58 |
| 7,106,971 B1 * | 9/2006 | Davis | 398/125 |
| 2003/0128786 A1 * | 7/2003 | Schmatz et al. | 375/359 |
| 2005/0058209 A1 * | 3/2005 | Magrath | 375/247 |
| 2006/0031701 A1 * | 2/2006 | Nam et al. | 713/500 |
| 2006/0150044 A1 * | 7/2006 | Lee et al. | 714/736 |
| 2006/0239341 A1 * | 10/2006 | Marlett et al. | 375/233 |
| 2007/0009072 A1 | 1/2007 | Jasa et al. | |
| 2007/0053446 A1 * | 3/2007 | Spilo | 375/259 |
| 2009/0122935 A1 | 5/2009 | Pang et al. | |
| 2009/0168810 A1 * | 7/2009 | Chengson et al. | 370/503 |
| 2010/0135666 A1 * | 6/2010 | Kim et al. | 398/99 |
| 2010/0322340 A1 | 12/2010 | Bohm | |
| 2011/0249718 A1 * | 10/2011 | Zerbe | 375/226 |
| 2012/0033774 A1 * | 2/2012 | Tanaka et al. | 375/371 |

* cited by examiner

*Primary Examiner* — Edan Orgad
*Assistant Examiner* — Emmanuel Maglo
(74) *Attorney, Agent, or Firm* — Shumaker & Sieffert, P.A.

(57) ABSTRACT

In general, techniques are described that insert one or more bits into a digital bit stream to maintain an overall transition density in the digital bit stream. Maintaining the overall transition density facilitates the generation of a recovered clock by a phase-locked loop (PLL) circuit of a receiver. For example, when a data transition ratio for a portion of the digital bit stream is less than a desired data transition ratio, the techniques insert additional bits to increase the overall transition density of the digital bit stream.

20 Claims, 7 Drawing Sheets

DIGITAL BIT INSERTION FOR CLOCK RECOVERY

TECHNICAL FIELD

This disclosure relates to clock recovery, and more particularly, to modification of a digital bit stream for the clock recovery.

BACKGROUND

Many devices that receive high-speed digital bit streams utilize a technique referred to as "clock recovery" in which a receive clock for processing the bit stream is not communicated separately from the bit stream but instead generated from the transmitted bit stream. Often, the receiving device utilizes a phase-locked loop (PLL) circuit to generate the receive clock for processing the received digital bit stream. A PLL circuit relies on data transitions in the received digital bit stream to generate the receive clock at the proper frequency and phase transitions. For example, the PLL circuit compares the time when a data transition occurred in digital bit stream to a time when a rising or falling edge occurred in the generated receive clock. The PLL circuit controls the phase of the receive clock based on the comparison to generate a phase-locked receive clock that aligns with the transitions with the communicated data.

SUMMARY

Example techniques described in this disclosure are directed to maintaining at least an overall transition density for serialized data transmitted as a high-speed stream of bits. Overall transition density refers to a data transition ratio, which is a ratio of the number of data transitions within a portion of the bit stream to the number of bits within the portion of the bit stream. If the data transition ratio is less than a desired data transition ratio, the transmitting device inserts additional bits (e.g., a code word) so that the data transition ratio is greater than or equal to the desired data transition ratio. Maintaining an overall transition density may allow a phase locked loop (PLL) circuit of a receiving device to generate a phase-locked receive clock with minimal drift, while optimizing insertion rate and lowering penalty of transition insertion versus conventional techniques that determine whether a maximum number of consecutive identical bits has been transmitted in the bit stream.

In one example, the disclosure is directed to a method that includes storing, with the transmitter, a portion of a digital bit stream, determining, with the transmitter, a data transition ratio between a number of data transitions in the stored portion and a number of digital bits in the stored portion, and comparing, with the transmitter, the determined data transition ratio with a desired data transition ratio. In accordance with the method, when the determined data transition ratio of the portion of the digital bit stream is less than the desired transition ratio, the method further includes inserting one or more digital bits into the digital bit stream to increase a number of data transitions in the digital bit stream such that the number of data transitions in the digital bit stream relative to a number of digital bits in the digital bit stream exceeds or is equal to the desired data transition ratio.

In another example, the disclosure is directed to an apparatus that includes a storage unit, and first, second, and third units. The storage unit is operable to store a portion of a digital bit stream. The first unit is operable to determine a data transition ratio between a number of data transitions in the stored portion and a number of digital bits in the stored portion. The second unit operable to compare the determined data transition ratio with a desired data transition ratio. In the apparatus, when the determined data transition ratio of the portion of the digital bit stream is less than the desired transition ratio, the third unit is operable to insert one or more digital bits into the digital bit stream to increase a number of data transitions in the digital bit stream such that the number of data transitions in the digital bit stream relative to a number of digital bits in the digital bit stream exceeds or is equal to the desired data transition ratio.

In another example, the disclosure is directed to a method that includes receiving, with a receiver, a first digital bit stream that includes one or more inserted digital bits that have been inserted based on a determination of a data transition ratio and a comparison of the data transition ratio to a desired data transition ratio. The method also includes identifying, with the receiver, one or more of the inserted digital bits, and deleting the identified one or more digital bits to generate a second digital bit stream.

In another example, the disclosure is directed to an apparatus that includes a first unit and a second unit. The first unit is operable to receive a first digital bit stream that includes one or more inserted digital bits that have been inserted based on a determination of a data transition ratio and a comparison of the data transition ratio to a desired data transition ratio, and identify one or more of the inserted digital bits. The second unit is operable to delete the identified one or more digital bits to generate a second digital bit stream.

In another example, the disclosure is directed to a system that includes a transmitter and a receiver. The transmitter is operable to store a portion of a first digital bit stream, determine a data transition ratio between a number of data transitions in the stored portion and a number of digital bits in the stored portion, and compare the determined data transition ratio with a desired data transition ratio. In the transmitter, when the determined data transition ratio of the portion of the first digital bit stream is less than the desired transition ratio, the transmitter is operable to insert one or more digital bits into the first digital bit stream to increase a number of data transitions in the first digital bit stream such that the number of data transitions in the first digital bit stream relative to a number of digital bits in the first digital bit stream exceeds or is equal to the desired data transition ratio. The receiver is operable to receive a second digital bit stream, from the transmitter, that includes one or more inserted digital bits that have been inserted based on the determination of the data transition ratio and the comparison of the data transition ratio to the desired data transition ratio. The receiver is further operable to identify one or more of the inserted digital bits, and delete the identified one or more digital bits.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
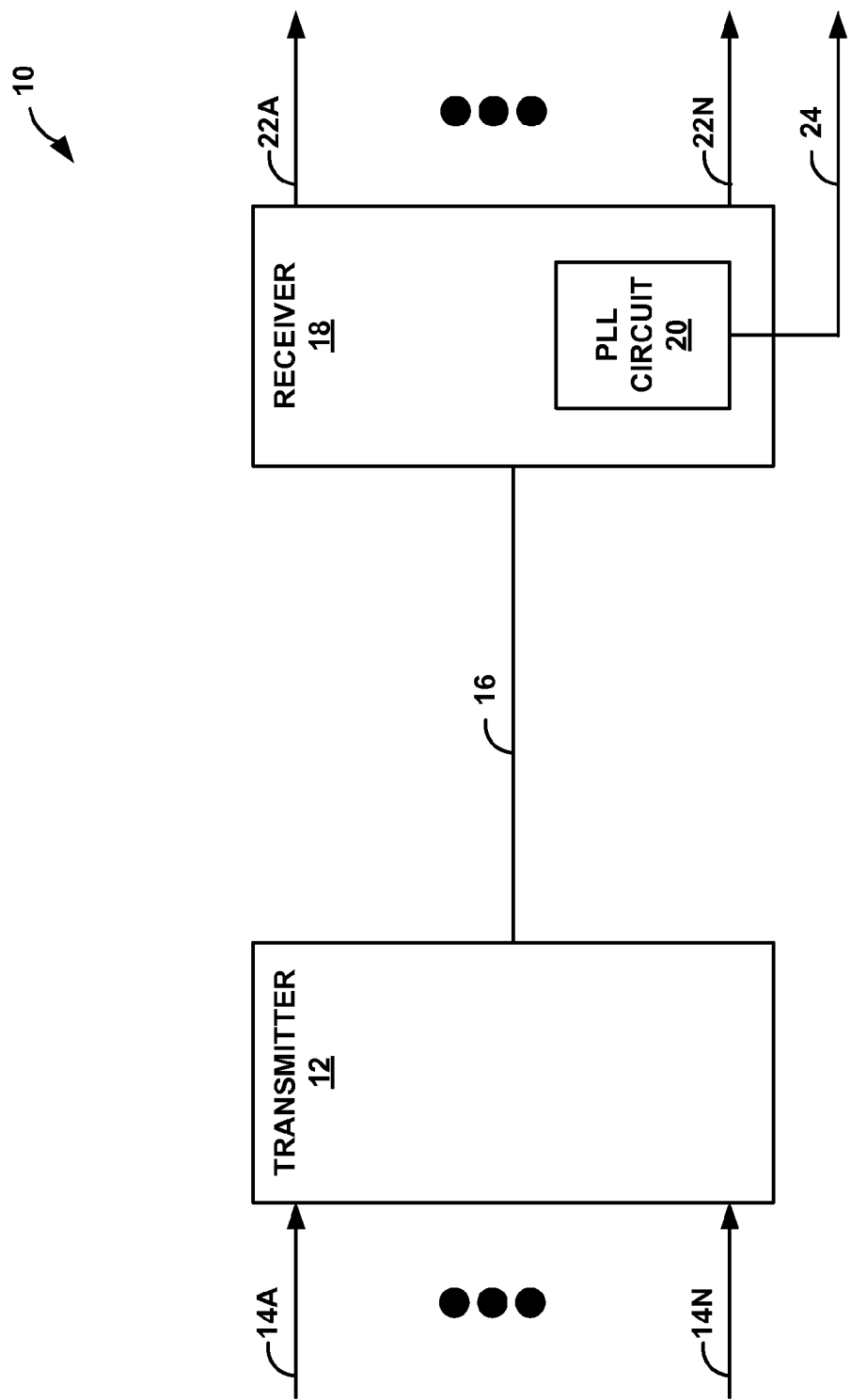
FIG. 1 is a block diagram illustrating an example of a communication system that includes a transmitter and a receiver.

FIG. 1 is a block diagram illustrating an example communication system 10. Communication system 10 includes transmitter 12, data link 16, and receiver 18. In communication system 10, transmitter 12 transmits a digital bit stream to receiver 18 via data link 16. Examples of transmitter 12 and receiver 18 include, but are not limited to, integrated circuits (IC) or standalone circuits that each resides on different electronic devices such as line-cards, routers, optical interfaces, or other types of devices that transmit and receive digital bit streams. As used here, the term device refers to any object that transmits or receives electronic data, including standalone devices and electronic device that are components of other systems or standalone devices. Examples of data link 16 include, but are not limited to, a wireless link, an optical link, an Ethernet line, a backplane, a coaxial cable, and the like. In some examples, data link 16 is a network link such as the Internet or a local area network (LAN). There may be other examples of transmitter 12, data link 16 and receiver 18, and aspects of the disclosure are not limited to the examples above.

In the example illustrated in FIG. 1, transmitter 12 is a serializer and receiver 18 is a deserializer. Accordingly, communication system 10 may be referred to as a serializer/deserailzer (SerDes) system. For example, transmitter 12 receives parallel digital bit streams 14A-14N (collectively referred to as "digital bit streams 14"), and serializes digital bit streams 14 into a single digital bit stream for transmission to receiver 18. Receiver 18 receives the single digital bit stream, and deserializes the single bit stream into parallel digital bit streams 22A-22N (collectively referred to as "digital bit streams 22").

The phrase digital bit stream refers to a data stream that includes a plurality of digital ones and zeros, e.g., digital bits. In some examples, transmitter 12 interleaves the digital bits or blocks of digital bits of each of digital bit streams 14 to generate the single digital bit stream for transmission. Receiver 18 de-interleaves the digital bits or blocks of digital bits of the single digital bit stream to generate digital bit streams 22.

Although transmitter 12 and receiver 18 are described as a serializer and a deserializer, aspects of this disclosure are not so limited. In alternate examples, transmitter 12 receives a single digital bit stream, processes the single digital bit stream, and transmits the processed single digital bit stream to receiver 18 via data link 16. Similarly, in these alternate examples, receiver 18 receives the single digital bit stream, processes the received single digital bit stream, and outputs the processed single digital bit stream.

Receiver 18 includes phase-locked loop (PLL) circuit 20. PLL circuit 20 receives the digital bit stream from transmitter 12 and generates an output clock referred to as recovered clock 24. Recovered clock 24 may function as the system clock for the devices that receive and process digital bit streams 22. In some examples, receiver 18 utilizes recovered clock 24 to synchronize digital bit streams 22. Recovered clock 24 may also assist receiver 18 in determining whether the received digital bits of the digital bit stream are digital ones or digital zeros.

To generate recovered clock 24, PLL circuit 20 includes a controllable oscillator such as a voltage controlled oscillator (VCO). The output of the oscillator is the recovered clock 24. PLL circuit 20 compares the time when a data transition occurred in the received digital bit stream with a rising or falling edge of recovered clock 24. The time when a data transition occurred in the received bit stream means a time when there is a rising or falling edge in the received digital bit stream, e.g., when a digital one follows a digital zero, and vice versa. Based on the comparison, PLL circuit 20 causes the oscillator to either increase or decrease the frequency of recovered clock 24 and thereby controls the phase of recovered clock 24 such that the rising or falling edges of recovered clock 24 occur at a time substantially similar to the time when the rising or falling edges occur in the received digital bit stream (e.g., data transitions in the digital bit stream). When this occurs, recovered clock 24 is considered to be phase-locked with the received digital bit stream.

When recovered clock 24 is phase-locked, recovered clock 24 can also be viewed as frequency-locked with the received digital bit stream. When frequency-locked, the frequency of recovered clock 24 is either substantially similar to the frequency at which transmitter 12 transmitted the digital bit stream, or a multiple of the frequency at which transmitter 12 transmitted the digital bit stream.

As indicated above, to generate recovered clock 24, PLL circuit 20 relies on data transitions, e.g., digital one to digital zero, or vice versa, in the received digital bit stream. If there are not sufficient data transitions within a portion of the received digital bit stream, the frequency of recovered clock 24 could potentially drift from its desired frequency. The term "drift" as used in this disclosure means the deviation of the frequency of recovered clock 24 from its desired phase-locked and frequency-locked frequency. When the frequency of recovered clock 24 drifts, recovered clock 24 is no longer phase and frequency-locked with the received digital bit stream.

As one example, if there are no data transitions within a hundred digital bits of the received digital bit stream, the frequency of recovered clock 24 may begin to drift, and lose frequency and phase lock. Recovered clock 24 may become frequency-locked shortly after these hundred digital bits when data transitions are available. However, when recovered clock 24 is not frequency-locked, the drift potentially causes bit errors in digital bit streams 22. For example, when frequency and phase-locked, recovered clock 24 indicates to receiver 18 an accurate time when receiver 18 to should determine whether a received digital bit is a digital one or a digital zero. When recovered clock 24 is not frequency and phase-locked, receiver 18 may not know when to determine whether a received digital bit is a digital one or a digital zero, and may not be able to properly discern between digital ones and digital zeros.

Accordingly, the drift of recovered clock 24 potentially causes the bit error rate (BER) to be greater than an allowable BER of system 10. BER is a ratio between the number of bit errors and the total number of received digital bits. For instance, communication system 10 may be designed for a BER of $10^{-12}$, e.g., 1 bit error per $10^{12}$ bits, and the frequency drift of recovered clock 24 can cause the BER to be greater than $10^{-12}$.

In accordance with one or more of the example techniques described in this disclosure, transmitter 12 determines in real-time a data transition ratio, which is a ratio between the number of transitions within a portion of the serialized digital bit stream (e.g., the digital bit stream resulting from the serialization of digital bit streams 14) and the number of digital bits within the portion of the serialized digital bit stream. If the data transition ratio is less than a desired data transition ratio, transmitter 12 inserts additional digital bits into the serialized digital bit stream so that the ratio is greater than or equal to the desired data transition ratio.

For example, assume that a portion of the serialized digital bit stream is 11001010. In this example, transmitter 12 will determine that there are five transitions in this portion, and the number of digital bits in the portion is eight. Accordingly, in this example, transmitter 12 will determine the data transition ratio to be 0.625, i.e., five divided by eight. If the desired data transition ratio is greater than 0.625, transmitter 12 inserts additional digital bits to force additional data transitions in the serialized digital bit stream, and thereby increase the data transition ratio to be greater than or equal to the desired data transition ratio.

The desired data transition ratio may be a configurable desired data transition ratio. For instance, the desired data transition ratio is represented as a number of transitions (referred to as X) within a portion of the serialized digital bit to the number of digital bits within the portion of the serialized digital bit stream (referred to as M). In other words, the desired data transition ratio equals X/M. In some examples, the value of X/M is selectable, and can be selected prior to operation or during operation (e.g., on-the-fly). As one example, transmitter 12 is preprogrammed with the desired data transition ratio. As another example, a device such as a processor that is internal to external to transmitter 12 programs the desired data transition ratio during operation.

The programmability of the desired data transition ratio provides for a flexible algorithm that allows for the techniques of this disclosure to be scalable across devices and technologies. For example, a user or a device such as a processor may select the desired data transition ratio based on the design of PLL circuit 20. In general, different designs of PLL circuit 20 exhibit different levels of drift when there are not sufficient data transitions in the received bit stream. Also, the data transition ratio needed to minimize drift is potentially different for different designs of PLL circuit 20. By programming the desired data transition ratio based on the design of the PLL circuit, for example, the user may ensure that different types of PLL circuits will receive sufficient data transitions to generate recovered clock 24 with tolerable drift (e.g., drift that does not increase the BER beyond desirable levels).

As one illustrative example, the transistors of PLL circuit 20 that generate recovered clock 24 tend to leak current if there are not sufficient data transitions in the received serialized bit stream. This leakage may be one potential cause of the frequency drift of recovered clock 24. The amount of current leakage may be a factor of transistor size and/or transistor placement, and is generally difficult to model. For example, 40 nanometer (nm) sized transistors tend to leak less than 28 nm sized transistors; however, the exact amount of leakage for transistors of either size, and smaller sized transistors in particular, may be difficult to model, and therefore difficult to estimate.

The flexibility gained by programming the desired data transition ratio allows the user or the processor to set the desired data transition ratio based on the leakage tendencies of the transistors of PLL circuit 20, in this example. For instance, if PLL circuit 20 is designed with transistors that are prone to leak, e.g., 28 nm sized transistors, the user or the processor may program transmitter 12 with a higher desired data transition ratio as compared to instances where PLL circuit 20 is designed with transistors that are less prone to leak, e.g., 40 nm sized transistors. In this manner, the techniques of this disclosure are flexible, which allow them to be extendable to a wide variety of transmitters and receivers.

Furthermore, by relying on a data transition ratio to determine when to insert bits, the example techniques described in this disclosure may provide for sufficient data transitions in the serialized bit stream for PLL circuit 20 to generate recovered clock 24, while minimizing latency associated with determining whether to insert bits. For example, some conventional techniques monitor the number of consecutive identical digits (CIDs), e.g., the number of consecutive digital ones or digital zeros. In accordance with these conventional techniques, if the number of CIDs is greater than a threshold number of CIDs, the conventional techniques insert one or more bits within the CIDs to force data transitions, and thereby reduce the number of CIDs.

However, for high-speed bit streams, such as the serialized digital bit stream, with the conventional techniques, it may be difficult to insert bits to ensure sufficient data transitions without negatively impacting latency. For instance, these conventional techniques are unaware that the bit stream included a greater number of CIDs than the allowable number of CIDs until after the threshold number of CIDs is violated. It is after the threshold number of CIDs is violated that these conventional techniques decide to insert one or more bits within the CIDs. Such post-violation insertion of bits may increase the amount of time before the data is transmitted (i.e., increase latency), which may be undesirable for high-speed transmission.

In accordance with one or more of example techniques described herein, transmitter 12 may be able to insert bits into the serialized digital bit stream prior to the occurrence of sufficient CIDs that negatively impact the ability of PLL circuit 20 to generate recovered clock 24 with tolerable, e.g., minimal, drift. For example, transmitter 12 may determine that the data transition ratio is less than the desired data transition ratio before there are excessive CIDs that negatively impact the ability of PLL circuit 20 to generate recovered clock 24. In this manner, transmitter 12 accelerates the insertion of bits, as compared to the conventional techniques, without incurring the latency penalty of the conventional techniques. Such acceleration of the insertion of bits, as compared to the conventional techniques, allows transmitter 12 to insert bits in-line with the bit stream, rather than after subsequent to the occurrence of excessive CIDs.

Also, in some examples, the techniques of this disclosure insert bits into the serialized bit stream on an as-need basis. For example, if the data transition ratio is greater than or equal to the desired data transition ratio, transmitter 12 does not insert additional bits. Otherwise, transmitter 12 inserts additional bits to force data transitions. In this manner, the techniques of this disclosure minimize the number of bits that need to be transmitted, while ensuring that there are sufficient data transitions for PLL circuit 20 to accurately generate recovered clock 24. Minimizing the number of bits that need to be transmitted results in reduction of overhead (e.g., unnecessary bits that are transmitted), which promotes efficient bandwidth utilization.

Figure 2:
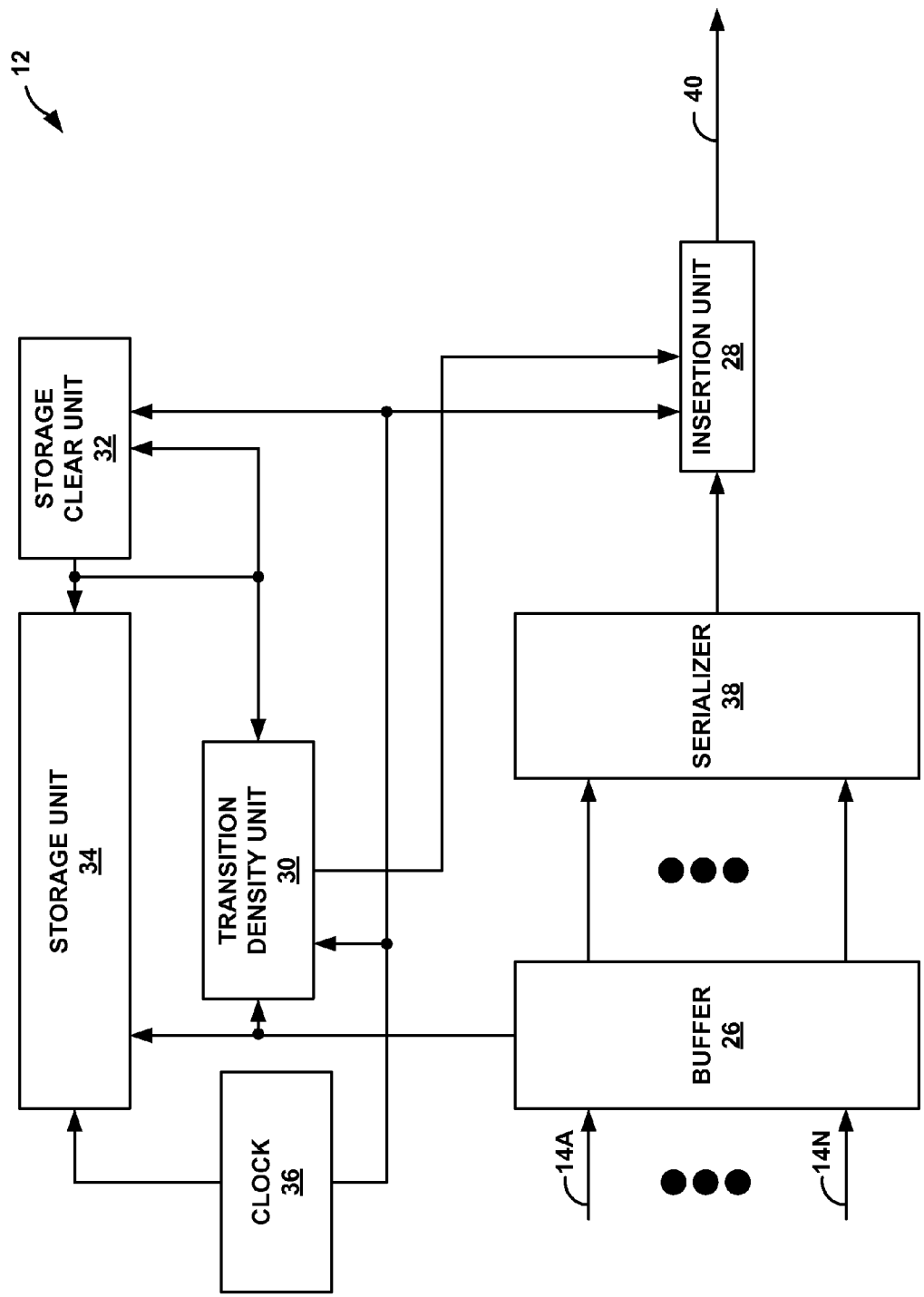
FIGS. 2-4 are block diagrams illustrating examples of the transmitter of FIG. 1 in further detail.
Figure 3:
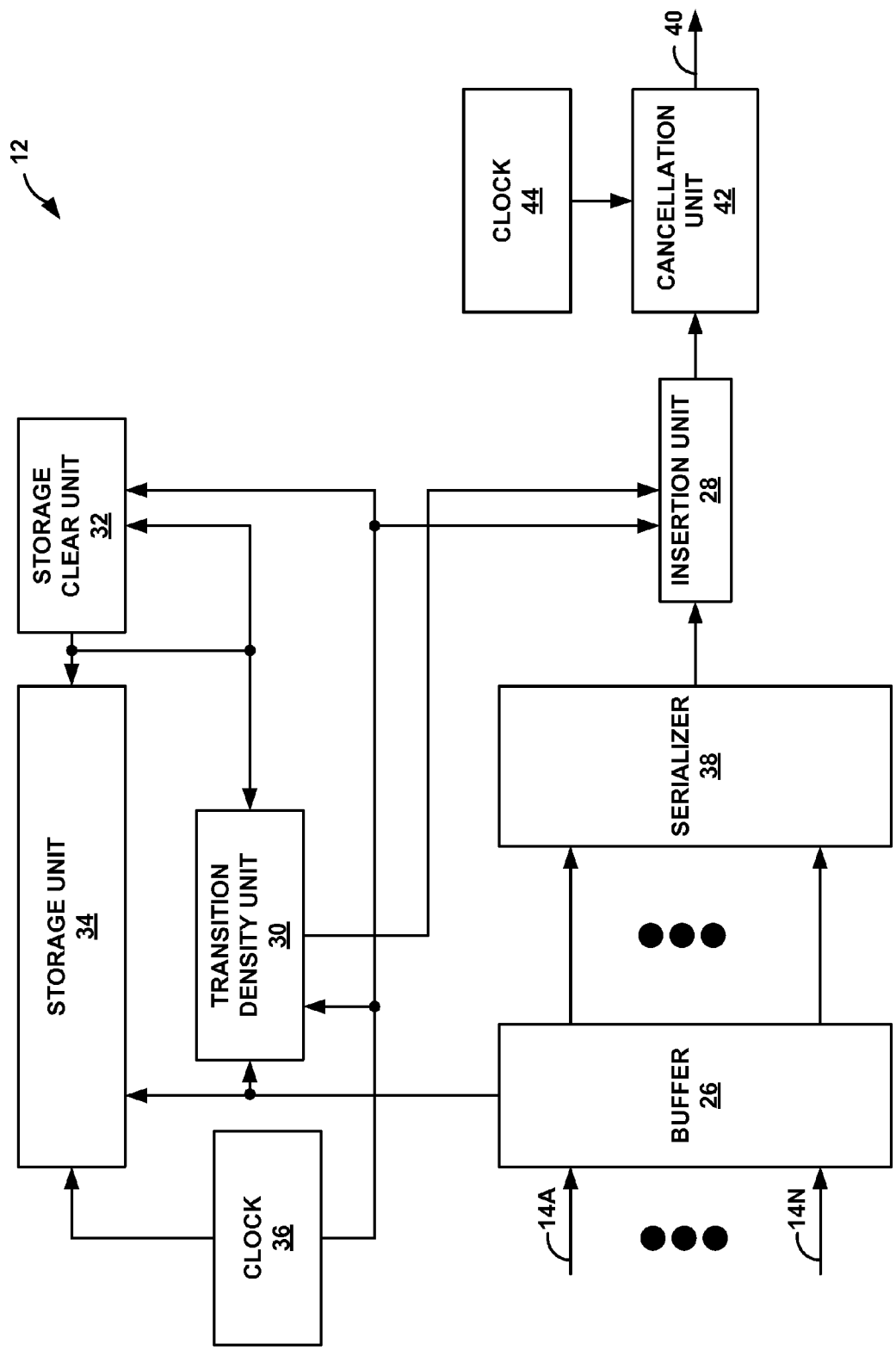
Figure 4:
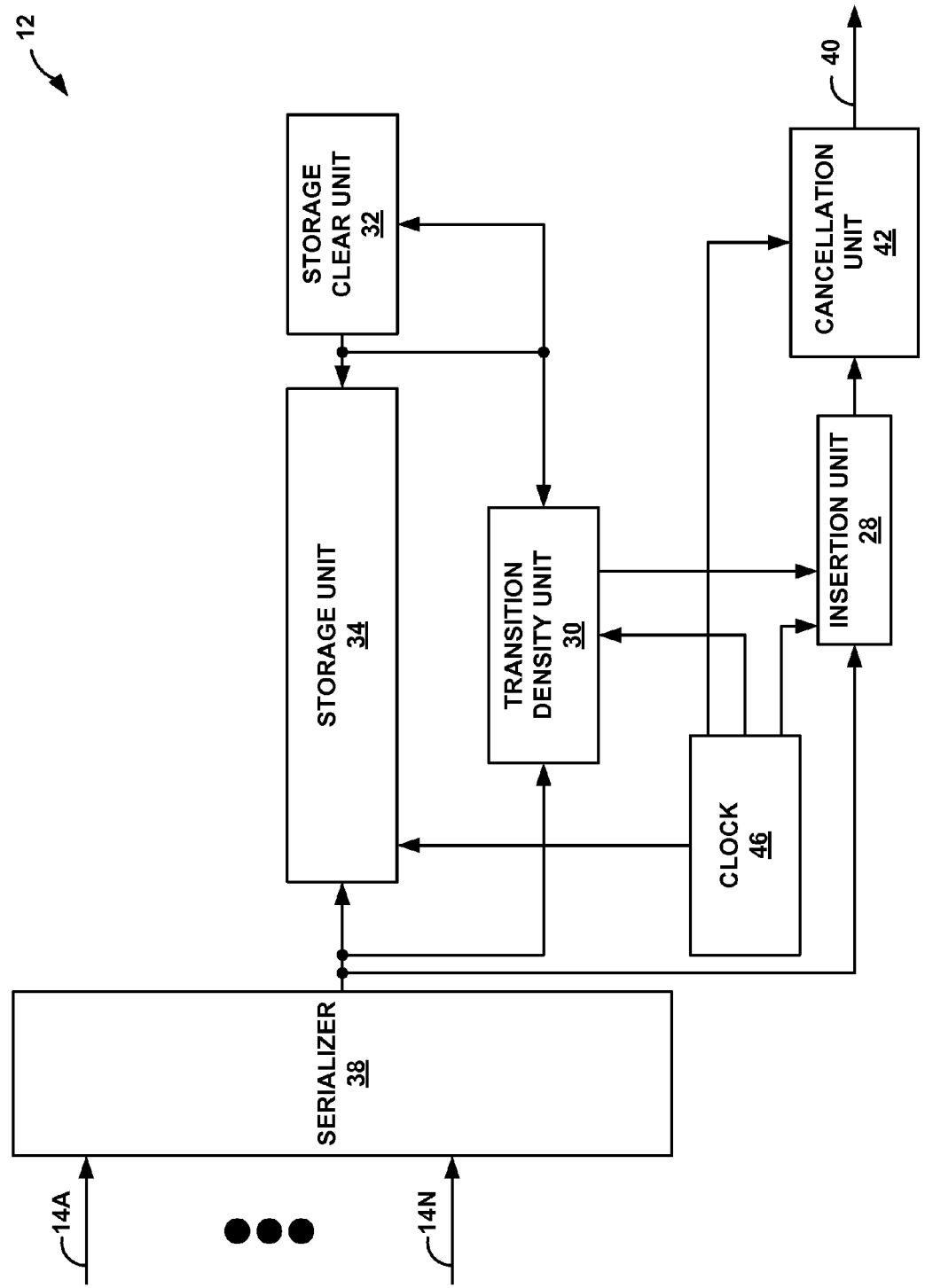

FIGS. 2-4 are block diagrams illustrating examples of transmitter 12 in further detail. The examples illustrated in FIGS. 2-4 are provided for purposes of illustration and should not be considered limiting. In general, transmitter 12 includes components that determine a data transition ratio between the number of transitions in a portion of a digital bit stream and the number of digital bits within the portion. The components of transmitter 12 also compare the determined data transition ratio to a desired data transition ratio. The components of transmitter 12 insert additional digital bits in the digital bit stream if the determine data transition ratio is less than the desired data transition ratio so that the resulting data transition ratio is equal to or greater than the desired data transition ratio.

In the example of FIG. 2, transmitter 12 includes buffer 26, insertion unit 28, transition density unit 30, storage clear unit 32, storage unit 34, clock 36, and serializer 38. Clock 36 controls the timing of storage unit 34 and transition density unit 30 as described below.

Although the various components of transmitter 12 are illustrated as separate components, transmitter 12 need not be so limited in every example. In alternate examples, one or more components of transmitter 12 may be combined into a single component. As one example, insertion unit 28, transition density unit 30, and storage clear unit 32 may be formed as a single component. Other permutations and combinations of the components of transmitter 12 are possible, and the techniques described in this disclosure should not be considered limited to the specific illustrated component arrangement.

Buffer 26 is capable of storing a bit-at-a-time of digital bit streams 14. For example, buffer 26 stores a first bit of digital bit stream 14A, a first bit of digital bit stream 14B, and so forth to a first bit of digital bit stream 14N. In this example, the size of buffer 26 is based on the number of digital bit stream 14. For instance, in the example of FIG. 2, buffer 26 includes storage locations to store up to N bits, e.g., one bit from each one of digital bits streams 14A-14N. Buffer 26 may be formed by registers of transmitter 12, or any other component of transmitter 12 that is capable of storing digital bits.

The stored digital bits in buffer 26 can be viewed as a "word" of the serialized bit stream outputted by transmitter 12 because these bits will eventually be serialized by serializer 38 to form the output bit stream. Accordingly, in this example, a "word" may include N bits.

In the example of FIG. 2, storage unit 34 receives the word stored in buffer 26.

Storage unit 34 is capable of storing multiple words. As an illustrative example, storage unit 34 is capable of storing up to 100 bits. However, the storage capability of storage unit 34 may be different for different examples of transmitter 12. For example, if the data rate of the output digital bit stream 40, e.g., the output of transmitter 12, is relatively high, e.g., in the order of 10 Gigabits per second (Gbps) or higher, the storage capability of storage unit 34 may be in order of thousands of bits. If the data rate of the output digital bit stream 40 is relatively low, e.g., in the order of 200 Megabits per second (Mbps) or lower, the storage capability of storage unit may be in the order of hundreds of bits.

An example of storage unit 34 is a shift-register. In alternate examples, rather than a shift-register, storage unit 34 may be replaced by any type of memory device that is capable of storing multiple words. However, a shift-register is a suitable option because it is internal to transmitter 12, can be accessed quickly by the components of transmitter 12, and can be easily implemented.

Storage unit 34 may function as a first-in-first-out (FIFO) shift-register. For example, storage unit 34 first stores the bit of digital bit stream 14A, then stores the bit of digital bit stream 14B, and so forth. In other words, buffer 26 receives bits of each of digital bit streams 14 in a parallel fashion, and storage unit 34 stores the bits in a serialized fashion. Storage unit 34 can be viewed as storing a portion of the bit stream, which will be serialized by serializer 38, because it stores the bits of digital bit streams 14 in a serialized fashion. As described in more detail, when storage unit 34 is full, storage clear unit 32 deletes the first N bits, e.g., the first bits of each of digital bit streams 14 stored in serialized fashion, so that storage unit 34 includes storage space to store the next N bits from buffer 26.

In some examples, the clock generated by clock 36 functions as a trigger that causes storage unit 34 to receive the word from buffer 26. For example, a rising, falling, or rising and falling edge of the clock generated by clock 36 may function as the trigger. There may be practical design limitations on how quickly storage unit 34 can receive digital bits. In some examples, the rate at which storage unit 34 can receive digital bits may be less than the frequency of digital bit streams 14. In these examples, the frequency of the clock generated by clock 36 is less than the frequency of digital bit streams 14.

As one example, the frequency of the clock generated by clock 36 is approximately 800 Mega-Hertz (MHz). However, the frequency of the clock generated by clock 36 may be different than 800 MHz. For example, if storage unit 34 is capable of performing functions at a rate that is substantially the same as the frequency of digital bit streams 14, then the frequency of the clock generated by clock 36 may be substantially the same as the frequency of the digital bit streams 14.

Transition density unit 30 determines the data transition ratio of the digital bits stored in storage unit 34. As one example technique to determine the data transition ratio of the digital bits store din storage unit 34, transition density unit 30 counts the number of data transitions of the bits that are entering and exiting storage unit 34. For instance, as storage unit 34 receives a word from buffer 26, transition density unit 30 counts the number of transitions within that received word. For example, transition density unit 30 counts the number of times a digital one is followed by a digital zero in the word received by storage unit 34, and vice-versa. Similarly, when storage clear unit 32 deletes a word from storage unit 34, transition density unit 30 counts the number of data transitions within the deleted word.

In this example, transition density unit 30 subtracts the number of exited data transitions from the number of entered data transitions, which indicates the total number of data transitions within storage unit 34. Transition density unit 30 divides the total number of data transitions within storage unit 34 with the number of bits that storage unit 34 is storing, e.g., the storage size of storage unit 34 in terms of the number of bits storage unit 34 can store. The result of the division is the data transition ratio of the portion of the bit stream stored in storage unit 34.

There may be other techniques with which transition density unit 30 may determine the data transition ratio of the digital bits store din storage unit 34. For example, rather than counting the number of entering and exiting transitions, transition density unit 30 may count the number of transitions that for the digital bits stored in the storage unit 34 after storage. The examples described in this disclosure should not be limited to the example techniques described above that transition density unit 30 may employ to determine the data transition ratio.

After determining the data transition ratio, transition density unit 30 instructs storage clear unit 32 to clear the word that was received the earliest (e.g., in a FIFO manner). In the example of FIG. 2, clock 36 provides the clock that causes storage clear unit 32 to clear the earliest received word from storage unit 34. Storage unit 34 then includes sufficient storage space to receive the next word from buffer 26. In this manner, storage unit 34 continuously stores a portion of the digital bit stream, and, as described in more detail, transition density unit 30 can repeatedly determine the data transition ratio for the stored portion of digital bit, and repeatedly compare the data transition ratio to the desired data transition ratio.

In the example of FIG. 2, transition density unit 30 compares the determined data transition ratio of the portion of the bit stream stored in storage unit 34 to the desired data transition ratio. For example, transition density unit 30 is preprogrammed with the value of the desired data transition ratio (e.g., the value X/M, or the values of X and M separately from which transition density unit 30 determines X/M) or programmed on-the-fly with the value of the desired data transition ratio. As one example, a processor or some other device programs transition density unit 30 with the desired data transition ratio prior to installing transmitter 12 in communication system 10. As another example, a processor or some other device programs transition density unit 30 subsequent to installing transmitter 12 in communication system 10, or during the operation of transmitter 12.

The desired data transition ratio may be based on a variety of factors such as the characteristics of the transistors of PLL circuit 20 that control recovered clock 24. Other factors may include characteristics of data link 16. For example, if data link 16 is a highly lossy link, the device external to transmitter 12 may program a higher desired data transition ratio compared to if data link 16 is not lossy. There may be additional factors that determine what the desired data transition ratio should be.

It should be understood that the comparison functions of transition density unit 30 may be performed by insertion unit 28 instead. In these examples, transition density unit 30 transmits the determined data transition ratio of the portion of the bit stream stored in storage unit 34 to insertion unit 28, and insertion unit 28 compares the determined data transition ratio to the desired data transition ratio. In this example, insertion unit 28 is preprogrammed or programmed on-the-fly with the desired data transition ratio. However, for purposes of brevity, the examples described herein are described as transition density unit 30 performing such functions.

Transition density unit 30 determines whether the determined data transition ratio is greater than, equal to, or less than the desired data transition ratio based on the comparison. If the determined data transition ratio is less than the desired data transition ratio, transition density unit 30 instructs insertion unit 28 to insert additional bits in the bit stream insertion unit 28 receives from serializer 38 to increase the overall transition density (e.g., increase the overall data transition ratio). If, however, the determined data transition ratio is greater than or equal to the desired data transition ratio, transition density unit 30 does not instruct insertion unit 28 to insert addition bits in the bit stream insertion unit 28 receives from serializer 28. In this situation, insertion unit 28 functions as a pass through for the bits that insertion unit 28 receives from serializer 38.

Serializer 38 receives the bits of digital bit streams 14 in parallel from buffer 26 and serializes the parallel bit streams into a single bit stream. For some examples of transmitter 12, this functionality of serializer 38 is generally occurring at a relative high speed. For example, the bit rate of the output bit stream of serializer 38 is potentially in order of 10 Gbps.

In some instances, it is possible that the serialized bit stream does not include sufficient data transitions upon which PLL circuit 20 can rely to generate recovered clock 24. For example, the output bit stream of serializer 38 can potentially include excessive consecutive identical digits (CIDs). CIDs may be consecutive digital zeros or digital ones. As an illustrative example, assume that there are 16 digital bit streams 14, i.e., N equals 16 in this example. Also, assume that each one of the 16 digital bit streams 14 included ten consecutive zeros in the same location in digital bit streams 14 relative to one another.

In this situation, when serializer 38 serializes these 16 digital bit streams 14, the resulting serialized bit stream will include 160 consecutive zeros (e.g., 16 multiplied by 10), and there will be no data transitions within these 160 consecutive zeros. The lack of data transitions may cause recovered clock 24 to drift. For example, recovered clock 24 will lose frequency and phase-lock and the frequency of recovered clock 24 will drift from the desired frequency.

In accordance with this disclosure, transition density unit 30 may determine that there are not sufficient data transitions in the bit stream outputted by serializer 38 prior to processing the CID that would cause recovered clock 24 to drift, e.g., lose frequency and phase-lock. For example, storage unit 34 stores a portion of a bit stream, where the bit stream is substantially similar to bit stream generated by serializer 38. For instance, as illustrated in FIG. 2, storage unit 34 stores bits of digital bit streams 14 that are stored in buffer 26, and serializer 38 receives the bits of digital bit streams 14 from buffer 26. In alternate examples, it may be possible for serializer 38 to receive the bits of digital bit streams 14 directly from digital bit streams 14. However, in any event, the bits stored in storage unit 34 may be identical to a portion of the bit stream generated by serializer 38.

Keeping with the previous example, assume that storage unit 34 stores 100 bits. In this instance, storage unit 34 will store 100 zeros of the 160 consecutive zeros. Transition density unit 30 will determine that there are no transitions in the bits stored in storage unit 34 because the 100 zeros include no data transitions. Transition density unit 30 will then determine that the data transition ratio is 0 (e.g., 0 transitions divided by 100 bits equals 0). A data transition ratio of 0 will in most cases be less than the desired data transition ratio. In this example, transition density unit 30 will instruct insertion unit 28 to insert additional bits into the output bit stream of serializer 38 so that the overall transition density is greater than or equal to the desired data transition ratio.

As can been seen from this example, insertion unit 28 may insert additional bits into the serialized bit stream prior to processing the digital bit that would cause recovered clock 24 to lose phase and frequency lock, e.g., prior to the serialization of the $160^{th}$ consecutive zero, in this example. In general, insertion unit 28 may insert additional bits into the serialized bit stream when the determined data transition ratio of the portion of the bit stream, as represented by the bits stored in the storage unit 34, is less than the programmable desired data transition ratio. Insertion unit 28 may be viewed as a speculative insertion unit because insertion unit 28 is able to insert bits early to maintain an overall transition density (e.g., prior to the processing of the digital bit that would cause recovered clock 24 to lose lock). In this manner, insertion unit 28 may be able to insert bits in-line with the output of serializer 38 without increasing penalty associated with latency, as described above.

In some examples, insertion unit 28 inserts additional bits into the next word stored in buffer 26 based on the determination of transition density unit 30, although aspects of this disclosure are not so limited. Insertion unit 28 may insert the additional bits at the end or even in the middle of the next word stored in buffer 26. Insertion unit 28 may be programmed with the specific bits that insertion unit 28 should insert when it receives an indication from transition density unit 30 to insert the bits. For example, a device (not shown) that is external to transmitter 12 may program insertion unit 28 with the specific bits that it should insert when indicated to do so by transition density unit 30.

In some examples, the additional bits that insertion unit 28 inserts causes the overall data transition density (e.g., overall data transition ratio) to be greater than or equal to the desired data transition ratio. For example, insertion unit 28 inserts one or more digital bits into the digital bit stream generated by serializer 38 to increase the number of data transitions in the digital bit stream generated by serializer 38 such that the number of data transitions in the digital bit stream generated by serializer 38 relative to the number of digital bits in the digital bit stream generated by serializer 38 exceed the desired data transition ratio. As one example, the additional bits form a code word. A code word refer to a specific set of a plurality of bits that receiver 18 can recognize as not being part of the original serialized bit streams 14. In this example, insertion unit 28 is programmed with the code word that insertion unit 28 should insert.

For example, the code word may be a plurality of bits that otherwise do not occur in the bit stream transmitted by transmitter 12, e.g., digital bit stream 40. For example, the devices that generate each one of digital bit streams 14 may be pre-programmed to generate streams that meet certain requirements. The code words may be a plurality of bits that do not meet the requirement placed on the devices that generate digital bit streams 14. In this manner, insertion unit 28 may ensure that the code word that insertion unit 28 inserts into the serialized bit stream is a code word that is recognizable by receiver 18, and can be removed by receiver 18 in the received digital bit stream 40.

There may be other techniques that insertion unit 28 may employ to insert bits that receiver 18 can recognize as not being part of the bit stream generated by serializer 38, e.g., the result of serializing digital bit streams 14. For example, the information transmitted by transmitter 12 to receiver 18 is sometimes packaged into separate command and data sequences that are each separately identifiable by receiver 18. In other words, digital bit stream 40 includes digital bits for data and digital bits for commands. In this example, insertion unit 28 may be operable to insert the code word in the command sequences so that receiver 18 can recognize them and recognize that the inserted code words are not part of the original data bit streams 14.

As another example, receiver 18 is programmed with the specific code words that insertion unit 28 inserts to includes the data transition ratio, with which receiver 18 recognizes the inserted code words, and can remove the inserted code words in digital bit stream 40. Receiver 18 may be programmed with the specific code words at start-up, as an example, and may be programmed with the specific code with flash, EEPROM, software, or any other technique to program receiver 18. In general, aspects of this disclosure should not be considered limited to the described example techniques that insertion unit 28 may employ to insert bits that receiver 18 can recognize as not being part of the serialized digital bit streams 14.

The code word inserted by insertion unit 28 includes a plurality of data transitions to increase the data transition ratio so that the overall data transition ratio is greater than or equal to the desired data transition ratio. As one example, the code word inserted by insertion unit 28 is "10101010." In this example, the code word includes seven data transitions. Accordingly, the inclusion of the "10101010" code word adds seven data transitions to the digital bit stream outputted by serializer 38. The inclusion of seven data transitions may be sufficient to increase the data transition ratio to be greater than or equal to the desired data transition ratio. As described above, when the data transition ratio is greater than or equal to the desired data transition ratio, PLL 20 of receiver 18 may be able to generate a recovered clock 24 with minimal drift.

Also, the example code word of "10101010" is provided for purposes of illustration and to ease understanding. In alternate examples, the specific bits that insertion unit 28 inserts may be different from "10101010" for different examples, and may be based on the design of PLL 20.

For example, if recovered clock 24 of PLL 20 does not tend to drift much when there is a lack of data transitions in the received digital bit stream, insertion unit 28 may insert fewer bits relative to the above examples, e.g., the code word may be "1010." For this case, the inclusion of three data transitions may be sufficient to ensure that the drift of recovered clock 24 is minimal, which in turn may ensure that the drift does not increase the bit error rate. As another example, if recovered clock 24 of PLL 20 tends to drift drastically when there is a lack of data transitions in the received digital bit stream, insertion unit 28 may insert additional bits relative to the above examples, e.g., the code word may be "1010101010." For this case, the inclusion of nine data transitions may be sufficient to ensure that the drift of recovered clock 24 is minimal and does not increase the bit error rate.

In some examples, the device that programs insertion unit 28 to insert the digital bits (e.g., the code word) may select the minimum number of digital bits needed to force the data transition ratio to be greater than or equal to the desired data transition ratio. For instance, the inclusion of additional digital bits consumes transmission bandwidth thereby delaying the reception of the original digital bit streams 14 transmitted by transmitter 12 because the digital bit stream transmitted by transmitter 12 now includes the original digital bit streams 14 and additional bits to assist PLL circuit 20 in generating recovered clock 24 that is phase and frequency locked with minimal drift. The inclusion of additional digital bits also potentially causes an increase in the bit error rate if the inserted digital bits are not properly received. By inserting the minimum number of digital bits needed to make the data transition ratio greater than or equal to the desired data transition ratio, the techniques of this disclosure may minimize the consumption of additional transmission bandwidth while also minimizing the drift of recovered clock 24 and thereby minimizing the bit error rate caused by the drift of recovered clock 24.

Receiver 18 receives digital bit stream 40 from transmitter 12 and deserializes the received digital bit stream 40 into digital bit streams 22. During the deserialization of digital bit stream 40, receiver 18 monitors for the code word that insertion unit 28 inserted into the serialized digital bit stream. In these examples, receiver 18 is preprogrammed with specific code word that insertion unit 28 inserts. Alternatively, receiver 18 is preprogrammed to detect words that violate the constraints placed on the devices that generate digital bit streams 14. As described above, in some examples, the plurality of bits of the code word may be such that the code word does not conform to the requirements for generating digital bit streams 14.

For example, if the code word is "10101010," receiver 18 monitors received digital bit stream 40 for this particular code word. If receiver 18 detects the "10101010" pattern of digital bits in digital bit stream 40, receiver 18 discards these bits of the code word because these bits were inserted by transmitter 12 for clock recovery and are not part of the original digital bit streams 14. The term "discard" means the receiver 18 removes the code word from further processing.

The example techniques described in this disclosure may provide one or more advantages. For example, the techniques of this disclosure may insert additional digital bits when the insertion of additional bits is desirable to reduce drift of recovered clock 24, and not insert additional digital bits when insertion of additional bits may not have an appreciable difference on the drift of recovered clock 24. In this manner, transmitter 12 minimizes the consumption of additional transmission bandwidth while minimizing the drift of recovered clock 24.

FIG. 3 is a block diagram illustrating another example of transmitter 12. Various components of transmitter 12, as illustrated in FIG. 3, are substantially similar to various components of transmitter 12, as illustrated in FIG. 2. To reduce redundancy and increase clarity, only the components of transmitter 12, as illustrated in FIG. 3, that are different from the components of transmitter 12, as illustrated in FIG. 2, are described further. For instance, the example of transmitter 12 illustrated in FIG. 3 includes cancellation unit 42. Cancellation circuit 42 is optional and not necessary in every example of transmitter 12.

Cancellation circuit 42 removes code words inserted by insertion unit 28 if such insertion may not increase operational performance of PLL circuit 20. For example, as described above, transition density unit 30 determines the data transition ratio based on the portion of the bit stream stored in storage unit 34. Because storage unit 34 stores a portion of the bit stream, transition density unit 30 may not have access to the entirety of the serialized bit stream when determining whether to instruct insertion unit 28 to insert additional bits, e.g., the code word.

For instance, a situation may arise where the data transition ration of the bits currently stored in storage unit 34 is less than the desired data transition ratio. However, in this example, the bits of the serialized bit stream that occurred prior to the current portion stored in storage unit 34 or the bits of the serialized bit stream that occur subsequent to the current portion stored in storage unit 34 provided a data transition ratio that is greater than the desired data transition ratio. In this example, assume that the data transition ratio based on the bits currently stored in storage unit 34 and the preceding or subsequent bits is greater than or equal to the desired data transition ratio.

In this example, the insertion of additional bits by insertion unit 28 may possibly not provide benefit to PLL circuit 20 in generating recovered clock 24 because there are sufficient data transitions. In other words, the data transition ratio for this part of the bit stream, which is greater than the portion stored in storage unit 34, is greater than or equal to the desired data transition ratio. However, in this example, transition density unit 30 may have instructed insertion unit 28 to insert additional bits in the serialized bit stream because the currently stored bits in storage unit 34 did not include sufficient data transitions. Such insertion may potentially increase transmission bandwidth.

Cancellation unit 42 may continuously count the number of data transitions and the number of bits in the digital bit stream outputted by insertion unit 28. The clock generated by clock 44 functions as the trigger that causes cancellation unit 42 to count the number of data transitions and the number of bits in the digital bit stream outputted by insertion unit 28. The frequency of the clock generated by clock 44 may be relatively high because the data rate of the digital bit stream outputted by insertion unit 28 is relatively high. For example, the frequency of the clock generated by clock 44 may be substantially similar to the data rate of the digital bit stream outputted by insertion unit 28.

In the example of FIG. 3, cancellation unit 42 may be operable to identify the code word inserted by insertion unit 28. When cancellation unit 42 identifies the code word inserted by insertion unit 28, cancellation unit 42 may subtract the amount of additional data transitions provided by the code word from the total counted number of data transitions. In these examples, cancellation unit 42 may also subtract the additional bits added by insertion unit 28 from the total counted number of bits in the digital bit stream outputted by insertion unit 28.

Cancellation unit 42 then divides the resulting values to determine a data transition ratio for the bit stream if insertion unit 28 were not to have inserted additional bits. Cancellation unit 42 compares this determined data transition ratio to the desired data transition ratio. In the example of FIG. 3, if the data transition ratio, as determined by cancellation unit 42, is greater than or equal to the desired data transition ratio, cancellation unit 42 may remove the additional bits inserted by insertion unit 28 (e.g., the code word). If, however, the data transition ratio, as determined by cancellation unit 42, is less than the desired data transition ratio, cancellation unit 42 may not remove the additional bits inserted by insertion unit 28. The output of cancellation unit 42 is the output of transmitter 12, e.g., digital bit stream 40.

In other words, in the example of FIG. 3, cancellation unit 42 may determine whether the removal of the bits added by insertion unit 28 would result in a data transition ratio that is greater than or equal to the desired data transition ratio. If cancellation unit 42 determines this to be the case, cancellation unit 42 removes the bits added by insertion unit 28. In this manner, cancellation unit 42 may ensure that the overall transition density of digital bit stream 40 is greater than or equal to the desired data transition ratio, while removing added bits if such addition does not further assist PLL circuit 20 in generating recovered clock 24 that is phase and frequency locked. In some cases, the removal of bits inserted by insertion unit 28 may be beneficial because of the number of bits that are transmitted is reduced, and the processing time required by receiver 18 to remove the code words inserted by insertion unit 28 is also reduced.

In examples where transmitter 12 does not include cancellation unit 42, even if the additional bits inserted by insertion unit 28 can be removed, but are not removed, the overall performance of communication system 10 may not appreciably degrade. In some examples, the situations where transition density unit 30 instructs insertion unit 28 to insert additional bits are minimal. For example, in these situations, the probability that the determined data transition ratio will be less than the desired data transition ratio is low. Therefore, in these examples, the additional bits inserted by insertion unit 28 do not drastically increase the number of bits that transmitter 12 transmits in digital bit stream 40, and any penalty associated with the increase in the number of bits that transmitter 12 transmits may be minimal.

FIG. 4 is a block diagram illustrating another example of transmitter 12. Various components of transmitter 12, as illustrated in FIG. 4, are substantially similar to various components of transmitter 12, as illustrated in FIGS. 2 and 3. In the example of FIG. 4, serializer 38 first serializes digital bit streams 14. Then, transmitter 12 determines the data transition ratio, and compares the data transition ratio to the desired data transition ratio.

For example, as illustrated in FIG. 4, serializer 38 directly receives digital bit streams 14, and serializes the digital bit streams. Accordingly, in this example, buffer 26 may not be needed. In the example of FIG. 4, storage unit 34 receives the serialized bit stream and stores a portion of the serialized bit stream similar to the examples of FIGS. 2 and 3. Transition density unit 30 and storage clear unit 32 perform functions similar to those described above with respect to the examples of FIGS. 2 and 3.

However, in the examples of FIG. 4, storage unit 34 and transition density unit 30 may function from the clock provided by clock 46. The frequency of clock 46 may be substantially similar to data rate of serialized bit stream generated by serializer 38. For instance, because transition density unit 30 determines the data transition ratio and compares the data transition ratio on the already serialized bit stream, such functionality of transition density unit 30 may need to occur much faster, as compared to the examples of FIGS. 2 and 3. Similarly, the rate at which storage unit 34 stores the bits of serializer 38 may be much faster, as compared to the examples of FIGS. 2 and 3.

In the example of FIG. 4, insertion unit 28 receives the serialized bit stream from serializer 38, and inserts additional bits when instructed to do so by transition density unit 30. Similar to the example of FIG. 3, cancellation unit 42 may determine whether the removal of the bits added by insertion unit 28 would result in a data transition ratio that is greater than or equal to the desired data transition ratio. In these instances, cancellation unit 42 removes the bits added by insertion unit 28 based on the determination. In FIG. 4, cancellation unit 42 is illustrated as an optional component and is not necessary in every example of transmitter 12.

Figure 5:
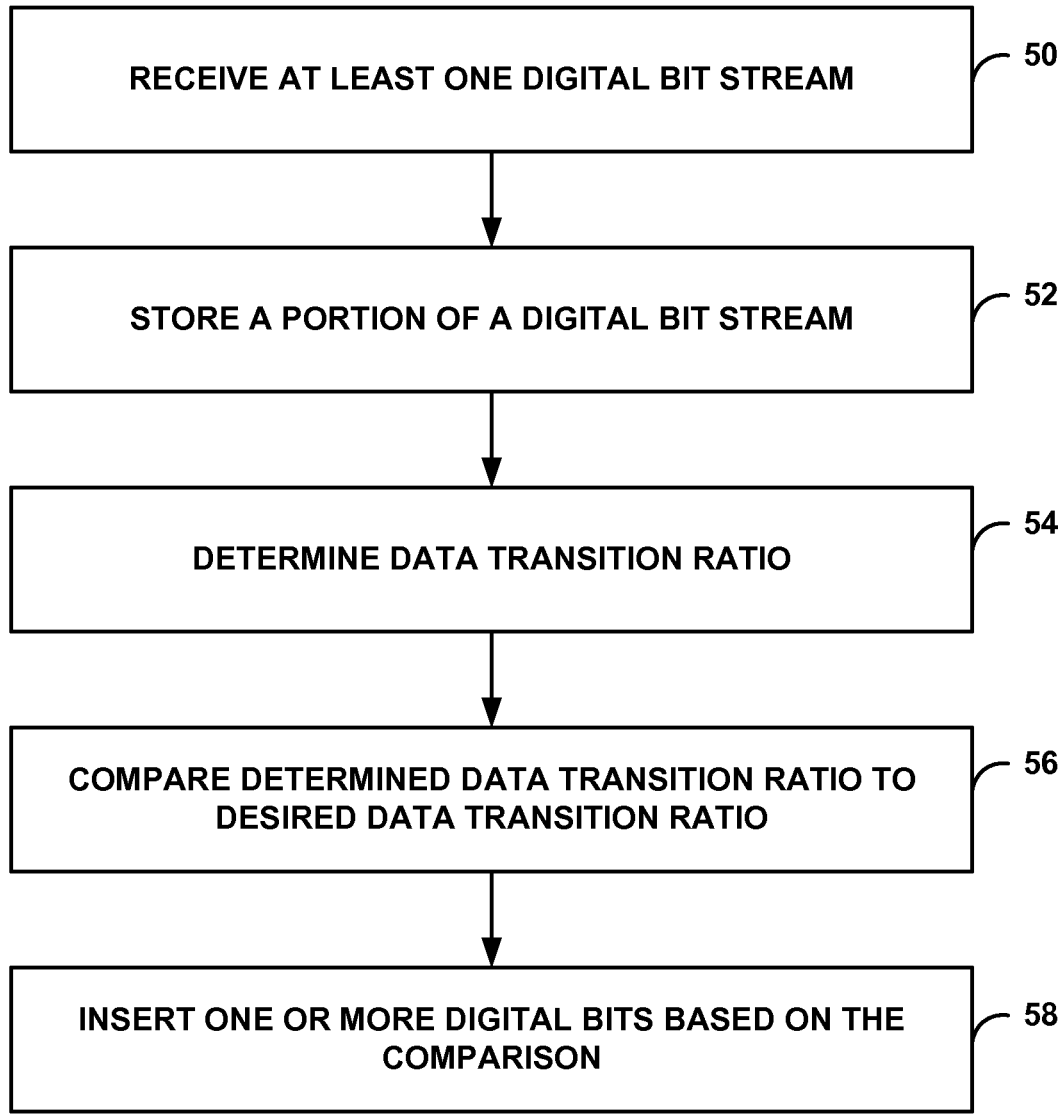
FIG. 5 is a flowchart illustrating an example operation of the transmitter of FIG. 1.

FIG. 5 is a flow chart illustrating an example operation of transmitter 12. For purposes of illustration and to ease understanding, reference is made to FIG. 2. However, the example operation illustrated in FIG. 5 should not be considered as being limited to the specific functional components illustrated in FIG. 2.

Transmitter 12 receives at least one digital bit stream, e.g., digital bit streams 14A-14N (50). Transmitter 12 stores a portion of a digital bit stream (52). For example, storage unit 34 stores bits that are substantially identical to the bits generated by serializer 38. In this way, storage unit 34 stores a portion of the digital bit stream.

Transmitter 12 determines a data transition ratio (54). For example, transition density unit 30 determines a data transition ratio of the digital bits stored in storage unit 34. For instance, transition density unit 30 determines the data transition ratio between the a number of data transitions in the digital bits of the portion stored in storage unit 34 and a number of digital bits stored in storage unit 34. As described above, a data transition occurs when a digital one follows a digital zero, and vice-versa.

Transition density unit 30, of transmitter 12, compares the determined data transition ratio to the desired data transition ratio (56). As described above, as an alternate example, insertion unit 28 may perform such comparison. In some examples, the desired data transition ratio is selectable, and transition density unit 30 is programmed with the selected desired data transition ratio. If the determined data transition ratio is greater than or equal to the desired data transition ratio, the probability that recovered clock 24 will drift to a point where there is an increase in the bit error rate beyond an acceptable bit error rate is minimized.

Based on the comparison, transmitter 12 inserts one or more bits in a serialized digital bit stream (58). For example, if transition density unit 30 determines that the data transition ratio is less than the desired data transition ratio, transition density unit 30 instructs insertion unit 28 to insert one or more digital bits into the bit stream generated by serializer 38, e.g., insert a code word that is distinguishable from the digital bits of digital bit streams 14, as one example. If transition density unit 30 determines that the data transition ratio is greater than or equal to the desired data transition ratio, transition density unit 30 does not instruct insertion unit 28 to insert additional bits, and insertion unit 28 allows the digital bit stream generated by serializer 38 to pass through without modification.

Figure 6:
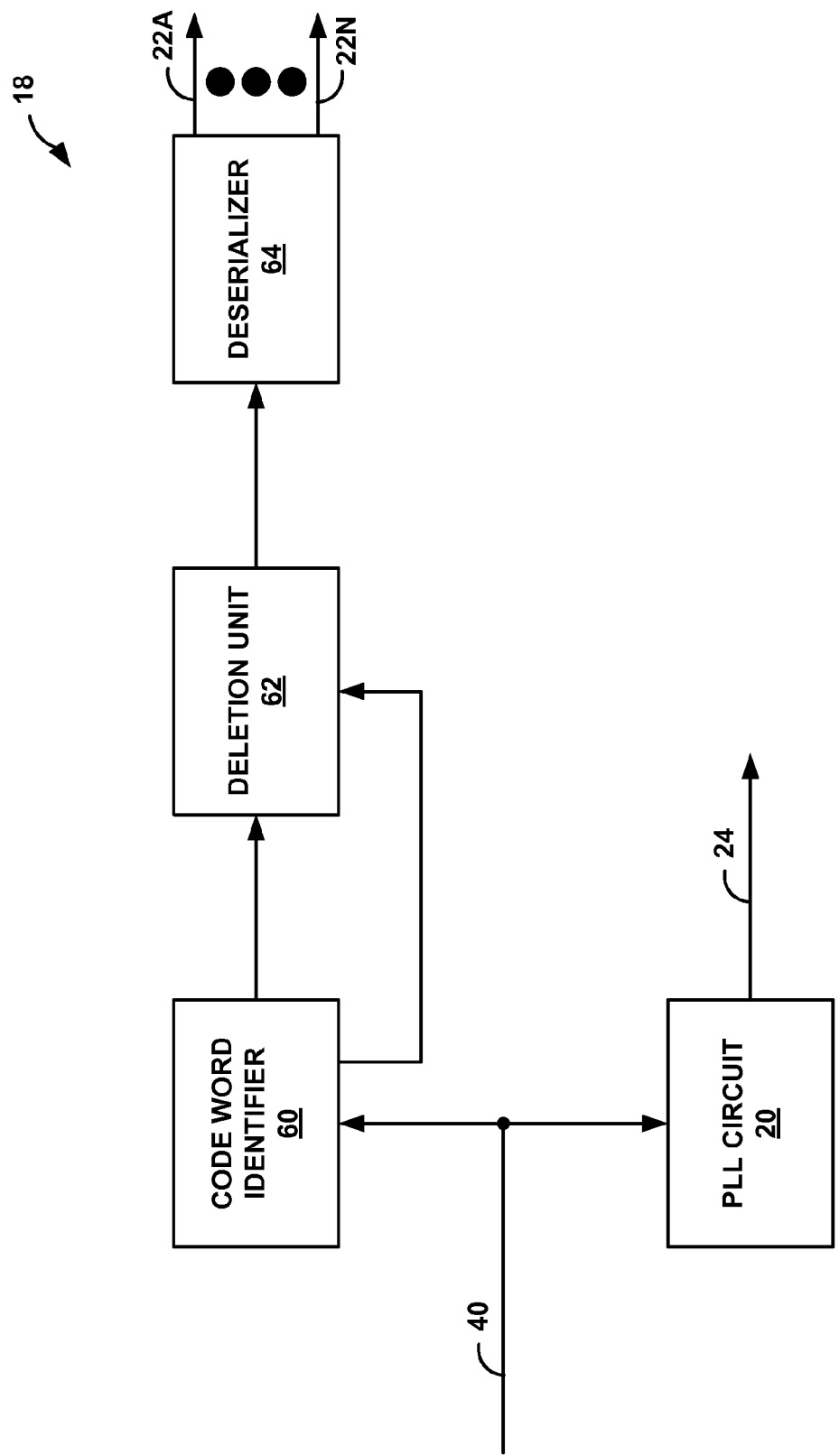
FIG. 6 is a block diagram illustrating an example of the receiver of FIG. 1 in further detail.

FIG. 6 is a block diagram illustrating an example of receiver 18. The example of FIG. 6 is provided for illustration purposes, and not all examples of receiver 18 necessarily include each of the components illustrated in FIG. 6. In general, receiver 18 receives digital bit stream 40 that includes additional inserted digital bits based on the data transition ratio of digital bit stream 40 prior to the insertion of the digital bits. Receiver 18 identifies the bits inserted into digital bit stream 40 by insertion unit 28 and deletes these bits. Receiver 18 then deserializes the resulting digital bit stream. In addition, receiver 18 generates recovered clock 24 based on the received digital bit stream 40 that includes the inserted digital bits.

As illustrated in FIG. 6, receiver 18 includes PLL circuit 20, code word identifier 60, deletion unit 62, and deserializer 64. PLL circuit 20 receives digital bit stream 40, and generates recovered clock 24, as described above. In addition, code word identifier 60 receives digital bit stream 40. Code word identifier 60 identifies the code words inserted by transmitter 12 in digital bit stream 40.

There may be various ways in which code word identifier 60 identifies the code words inserted by transmitter 12 in digital bit stream 40. As one example, code word identifier 60 may be preprogrammed with the specific word that insertion unit 28 is programmed to insert. As another example, code word identifier 60 may be designed to identify words that do not comply the requirements for the generation of digital bit streams 14. In general, code word identifier 60 may identify the code word utilizing any technique, and aspects of this disclosure are not limited to the techniques described above.

Deletion unit 62 deletes the code word. For example, when code word identifier 60 identifies a code word in received digital bit stream 40, code word identifier 60 indicates to deletion unit 62 which bits of the received digital bit stream 40 deletion unit 62 should delete. In response, deletion unit 62 deletes the bits that code word identifier 60 instructed deletion unit 42 to delete. After deletion unit 62 deletes the inserted code word, deserializer 64 receives the digital bit stream from deletion unit 62. Deserializer 64 deserializes the received digital bits of digital bit stream 40 to generate digital bit streams 22.

Figure 7:
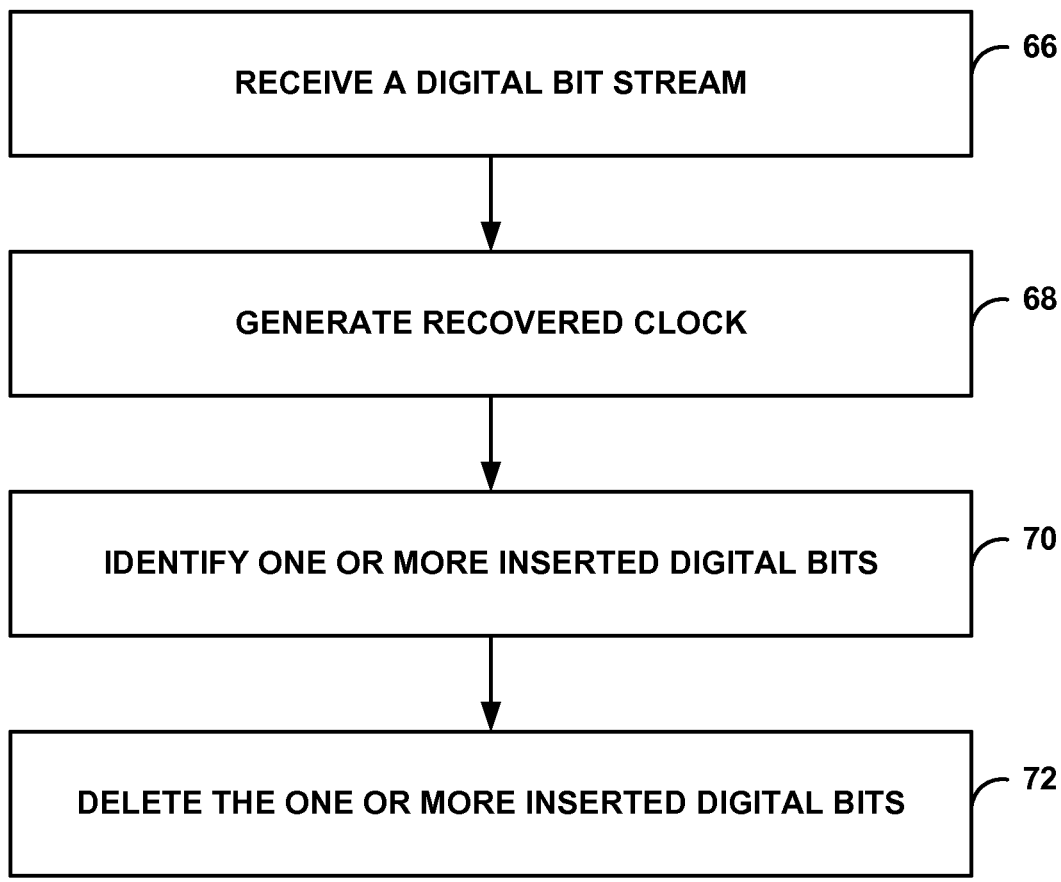
FIG. 7 is a flowchart illustrating an example operation of the receiver of FIG. 1.

FIG. 7 is a flowchart illustrating an example operation of receiver 18. For purposes of illustration and to ease understanding, reference is made to FIG. 6. However, the example operation illustrated in FIG. 7 should not be considered as being limiting to the specific functional components illustrated in FIG. 6.

Receiver 18 receives a digital bit stream that includes one or more inserted digital bits based on a determination of a data transition ratio and a comparison of the data transition ratio to a desired data transition ratio (66). For example, PLL circuit 20 and code word identifier 60 receive digital bit stream 40.

PLL circuit 20 generates recovered clock 24 from the received digital bit stream (68). Code word identifier 60 identifies the code word or words in digital bit stream 40 (70). Deletion unit 62 deletes the digital bits inserted by transmitter 12, in response to the code words identified by code word identifier 60 (72).

The techniques of this disclosure may be implemented in a wide variety of devices or apparatuses, including line-cards, routers, optical interfaces, wireless devices, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

The invention claimed is:

1. A method comprising:
   storing, with a transmitter, a portion of a digital bit stream;
   determining, with the transmitter, a data transition ratio between a number of data transitions in the stored portion and a number of digital bits in the stored portion, wherein the number of data transitions comprises a number of instances that a digital bit having a first value is followed by an immediately subsequent digital bit having a second, different value in the digital bits in the stored portion;
   comparing, with the transmitter, the determined data transition ratio with a desired data transition ratio; and
   when the determined data transition ratio of the portion of the digital bit stream is less than the desired transition ratio and prior to transmitting a last digital bit of consecutive identical digits that would have caused a recovered clock of a receiver to lose phase and frequency lock, inserting one or more digital bits into the digital bit stream to increase a number of data transitions in the digital bit stream such that the number of data transitions in the digital bit stream relative to a number of digital bits in the digital bit stream exceeds or is equal to the desired data transition ratio.

2. The method of claim 1, further comprising:
   determining whether removing the inserted one or more digital bits results in a data transition ratio of the digital bit stream being greater than or equal to the desired data transition ratio; and
   removing the inserted one or more digital bits when removing the inserted one or more digital bits results in the data transition ratio of the digital bit stream being greater than or equal to the desired data transition ratio.

3. The method of claim 1, wherein the desired data transition ratio is defined as user-programmable values of a number of transitions X over a number of digital bits M.

4. The method of claim 1, wherein inserting one or more digital bits comprises inserting preprogrammed specific bit values when the determined data transition ratio of the portion of the digital bit stream is less than the desired data transition ratio.

5. The method of claim 1, wherein storing a portion of a digital bit stream comprises storing bits that are substantially identical to a portion of a serialized bit stream.

6. The method of claim 1, wherein each instance that the digital bit having the first value is followed by the immediately subsequent bit having the second, different value occurs when a digital one follows a digital zero in the stored portion, or a digital zero follows a digital one in the stored portion.

7. An apparatus comprising:
   a storage unit configured to store a portion of a digital bit stream; and
   one or more circuits configured to:
   determine a data transition ratio between a number of data transitions in the stored portion and a number of digital bits in the stored portion, wherein the number of data transitions comprises a number of instances that a digital bit having a first value is followed by an immediately subsequent digital bit having a second, different value in the digital bits in the stored portion;
   compare the determined data transition ratio with a desired data transition ratio; and
   when the determined data transition ratio of the portion of the digital bit stream is less than the desired transition ratio and prior to transmitting a last digital bit of consecutive identical digits that would have caused a recovered clock of a receiver to lose phase and frequency lock, insert one or more digital bits into the digital bit stream to increase a number of data transitions in the digital bit stream such that the number of data transitions in the digital bit stream relative to a number of digital bits in the digital bit stream exceeds or is equal to the desired data transition ratio.

8. The apparatus of claim 7, wherein the one or more circuits comprises a first circuit and a second circuit, wherein the first circuit is configured to determine the data transition ratio between the number of data transitions in the stored portion and the number of digital bits in the stored portion, and compare the determined data transition ratio with the desired data transition ratio, and wherein, prior to transmitting a last digital bit of consecutive identical digits that would have caused a recovered clock to lose phase and frequency lock, the second circuit is configured to insert one or more digital bits into the digital bit stream to increase the number of data transitions in the digital bit stream such that the number of data transitions in the digital bit stream relative to the number of digital bits in the digital bit stream exceeds or is equal to the desired data transition ratio when the determined data transition ratio of the portion of the digital bit stream is less than the desired transition ratio.

9. The apparatus of claim 7, wherein the one or more circuits are configured to determine whether removing the inserted one or more digital bits results in a data transition ratio of the digital bit stream being greater than or equal to the desired data transition ratio, and configured to remove the inserted one or more digital bits when removing the inserted one or more digital bits results in the data transition ratio of the digital bit stream being greater than or equal to the desired data transition ratio.

10. The apparatus of claim 7, wherein the desired data transition ratio is defined as user-programmable values of a number of transitions X over a number of digital bits M.

11. The apparatus of claim 7, wherein the one or more circuits are configured to insert preprogrammed specific bits when the determined data transition ratio is less than the desired data transition ratio to insert the one or more digital bits into the digital bit stream.

12. The apparatus of claim 7, wherein the one or more circuits are configured to store bits that are substantially identical to a portion of a serialized bit stream to store the portion of the digital bit stream.

13. The apparatus of claim 7, wherein each instance that the digital bit having the first value is followed by the immediately subsequent bit having the second, different value occurs when a digital one follows a digital zero in the stored portion, or a digital zero follows a digital one in the stored portion.

14. A method comprising:
   receiving, with a receiver, a first digital bit stream that includes one or more inserted digital bits that have been inserted based on a determination of a data transition ratio and a comparison of the data transition ratio to a desired data transition ratio, wherein the data transition ratio comprises a ratio between a number of data transitions in a portion and a number of digital bits in the portion, and wherein the number of data transitions comprises a number of instances that a digital bit having a first value is followed by an immediately subsequent digital bit having a second, different value in the digital bits in the portion, wherein the one or more inserted digital bits have been inserted into the first digital bit stream prior to the receiver processing a last digital bit of consecutive identical digits that would have caused a recovered clock to lose phase and frequency lock;

identifying, with the receiver, one or more of the inserted digital bits; and deleting the identified one or more digital bits to generate a second digital bit stream.

15. The method of claim 14, further comprising generating the recovered clock from the first digital bit stream.

16. The method of claim 14, further comprising deserializing the second digital bit stream into a plurality of digital bit streams.

17. An apparatus comprising:
one or more circuits configured to:
receive a first digital bit stream that includes one or more inserted digital bits that have been inserted based on a determination of a data transition ratio and a comparison of the data transition ratio to a desired data transition ratio, and identify one or more of the inserted digital bits, wherein the data transition ratio comprises a ratio between a number of data transitions in a portion and a number of digital bits in the portion, and wherein the number of data transitions comprises a number of instances that a digital bit having a first value is followed by an immediately subsequent digital bit having a second, different value in the digital bits in the portion, wherein the one or more inserted digital bits have been inserted into the first digital bit stream prior to the receiver processing a last digital bit of consecutive identical digits that would have caused a recovered clock to lose phase and frequency lock;
identify one or more of the inserted digital bits; and
delete the identified one or more digital bits to generate a second digital bit stream.

18. The apparatus of claim 17, further comprising a phase-locked loop (PLL) circuit configured to generate the recovered clock from the first digital bit stream.

19. The apparatus of claim 17, further comprising a deserializer configured to deserialize the second digital bit stream into a plurality of digital bit streams.

20. A system comprising:
a transmitter configured to store a portion of a first digital bit stream, determine a data transition ratio between a number of data transitions in the stored portion and a number of digital bits in the stored portion, wherein the number of data transitions comprises a number of instances that a digital bit having a first value is followed by an immediately subsequent digital bit having a second, different value in the digital bits in the stored portion, the transmitter further configured to compare the determined data transition ratio with a desired data transition ratio, and when the determined data transition ratio of the portion of the first digital bit stream is less than the desired transition ratio and prior to transmitting a last digital bit of consecutive identical digits that would have caused a recovered clock to lose phase and frequency lock, insert one or more digital bits into the first digital bit stream to increase a number of data transitions in the first digital bit stream such that the number of data transitions in the first digital bit stream relative to a number of digital bits in the first digital bit stream exceeds or is equal to the desired data transition ratio; and
a receiver configured to receive a second digital bit stream, from the transmitter, that includes one or more inserted digital bits that have been inserted based on the determination of the data transition ratio and the comparison of the data transition ratio to the desired data transition ratio, wherein the receiver is further configured to identify one or more of the inserted digital bits, and delete the identified one or more digital bits.

\* \* \* \* \*